(12) United States Patent
Maziuk, Jr.

(10) Patent No.: US 7,481,987 B2
(45) Date of Patent: Jan. 27, 2009

(54) METHOD OF REMOVING SULFUR TRIOXIDE FROM A FLUE GAS STREAM

(75) Inventor: John Maziuk, Jr., Kingwood, TX (US)

(73) Assignee: Solvay Chemicals, Houston, TX (US)

(*) Notice: Subject to any disclaimer, the term of this patent is extended or adjusted under 35 U.S.C. 154(b) by 60 days.

(21) Appl. No.: 11/229,011

(22) Filed: Sep. 15, 2005

(65) Prior Publication Data

US 2007/0081936 A1 Apr. 12, 2007

(51) Int. Cl.
*B01D 49/00* (2006.01)
*B01D 53/50* (2006.01)
*C01D 5/00* (2006.01)

(52) U.S. Cl. .................. 423/215.5; 423/235; 423/242.1; 423/244.07; 423/244.08; 423/DIG. 5; 423/DIG. 8; 423/551

(58) Field of Classification Search .............. 423/242.1, 423/244.07, 244.08, 235, 215.5, 551, DIG. 5, 423/DIG. 8
See application file for complete search history.

(56) References Cited

U.S. PATENT DOCUMENTS

| | | | | |
|---|---|---|---|---|
| 3,524,720 A | * | 8/1970 | Bauer | 423/244.08 |
| 3,704,569 A | | 12/1972 | Hardison et al. | |
| 3,709,977 A | * | 1/1973 | Villiers-Fisher | 423/244.07 |
| 3,722,178 A | | 3/1973 | Aaland et al. | |
| 3,832,444 A | * | 8/1974 | Doyle | 423/243.1 |
| 3,833,711 A | * | 9/1974 | Villiers-Fisher | 423/244.08 |
| 3,846,535 A | | 11/1974 | Fonseca | |
| 3,868,444 A | | 2/1975 | Frevel et al. | |
| 3,880,629 A | | 4/1975 | Dulin et al. | |
| 3,897,540 A | | 7/1975 | Onnen | |
| 3,911,084 A | | 10/1975 | Wall et al. | |
| 3,932,587 A | | 1/1976 | Grantham et al. | |
| 3,932,588 A | | 1/1976 | Libutti et al. | |
| 3,966,878 A | | 6/1976 | Pausch et al. | |
| 3,984,296 A | | 10/1976 | Richards | |

(Continued)

FOREIGN PATENT DOCUMENTS

EP 0 170 355 A2 2/1986

(Continued)

OTHER PUBLICATIONS

L.J. Muzio et al.; "22 MW Coal-Fired Demonstration of Dry $SO^2$ Scrubbing with Sodium Sorbent Compounds"; Second EPRI Conference on Fabric Filter Technology for Coal-Fired Power Plants; Denver, Colorado; Mar. 22-24, 1983.

(Continued)

*Primary Examiner*—Timothy C Vanoy
(74) *Attorney, Agent, or Firm*—Brinks Hofer Gilson & Lione

(57) ABSTRACT

A method is provided for reducing the fouling during the removal of sulfur trioxide from a flue gas stream by maintaining the reagent (i. e. sodium sesquicarbonate) in contact with the flue gas for a sufficient time and temperature to react a portion of the reagent with a portion of the sulfur trioxide to substantially avoid formation of liquid phase $NaHSO_4$ reaction product that combines with the fly ash so as to not form a sticky ash residue that adheres to the flue gas duct, wherein the reaction product of the reagent and the sulfur trioxide is selected from the group consisting of $Na_2SO_4$, $Na_2S_2O_7$ and mixtures thereof.

21 Claims, 2 Drawing Sheets

U.S. PATENT DOCUMENTS

| | | | |
|---|---|---|---|
| 3,984,312 A | 10/1976 | Dulin et al. | |
| 3,989,797 A | 11/1976 | Brady et al. | |
| 4,001,384 A * | 1/1977 | Iwakura et al. | 423/551 |
| 4,034,063 A * | 7/1977 | Rosar et al. | 75/429 |
| 4,105,744 A | 8/1978 | Erdoess et al. | |
| 4,113,447 A | 9/1978 | Bennett et al. | |
| 4,183,902 A | 1/1980 | Hashimoto et al. | |
| 4,185,080 A | 1/1980 | Rechmeier | |
| 4,197,278 A | 4/1980 | Gehri et al. | |
| 4,198,380 A | 4/1980 | Kohl | |
| 4,208,192 A | 6/1980 | Quigley et al. | |
| 4,220,478 A | 9/1980 | Schuff | |
| 4,244,930 A | 1/1981 | Weber | |
| 4,247,525 A | 1/1981 | Voeste | |
| 4,273,750 A | 6/1981 | Hollett, Jr. et al. | |
| 4,306,885 A | 12/1981 | Kober et al. | |
| 4,352,747 A | 10/1982 | Every et al. | |
| 4,385,039 A | 5/1983 | Lowell et al. | |
| 4,391,207 A | 7/1983 | Petersen | |
| 4,410,500 A | 10/1983 | Wang et al. | |
| 4,431,618 A | 2/1984 | Boward, Jr. et al. | |
| 4,439,351 A | 3/1984 | Sinha | |
| 4,452,766 A | 6/1984 | Pike | |
| 4,481,172 A | 11/1984 | Lowell et al. | |
| 4,504,451 A * | 3/1985 | Quee et al. | 423/243.1 |
| 4,533,364 A | 8/1985 | Altman et al. | |
| 4,540,554 A | 9/1985 | Dayen | |
| 4,547,351 A | 10/1985 | Im et al. | |
| 4,555,391 A * | 11/1985 | Cyran et al. | 423/244.07 |
| 4,559,211 A * | 12/1985 | Feldman et al. | 423/243.01 |
| 4,588,569 A | 5/1986 | Cyran et al. | |
| 4,595,576 A | 6/1986 | Andreasen et al. | |
| 4,609,539 A | 9/1986 | Horecky et al. | |
| 4,615,780 A | 10/1986 | Walker | |
| 4,620,856 A | 11/1986 | Rosenberg et al. | |
| 4,629,545 A | 12/1986 | Mani et al. | |
| 4,645,652 A | 2/1987 | Kimura | |
| 4,663,136 A | 5/1987 | Furlong | |
| 4,664,893 A | 5/1987 | Sarapata et al. | |
| 4,726,710 A | 2/1988 | Rosar et al. | |
| 4,738,690 A | 4/1988 | Radway et al. | |
| 4,743,439 A | 5/1988 | Ready | |
| 4,756,892 A | 7/1988 | Kragh et al. | |
| 4,780,290 A | 10/1988 | Curtius | |
| 4,783,325 A | 11/1988 | Jones | |
| 4,795,619 A | 1/1989 | Lerner | |
| 4,810,478 A | 3/1989 | Graf | |
| 4,839,147 A | 6/1989 | Lindbauer et al. | |
| 4,844,915 A | 7/1989 | Hooper | |
| 4,853,194 A | 8/1989 | Hino et al. | |
| 4,859,438 A | 8/1989 | Lindbauer et al. | |
| 4,871,522 A | 10/1989 | Doyle | |
| 4,872,887 A | 10/1989 | Altman et al. | |
| 4,917,875 A | 4/1990 | Moore et al. | |
| 4,921,886 A * | 5/1990 | Ewan et al. | 423/235 |
| 4,940,569 A | 7/1990 | Neal et al. | |
| 4,946,311 A | 8/1990 | Rosar et al. | |
| 4,954,324 A | 9/1990 | Hooper | |
| 4,960,445 A | 10/1990 | Helfritch | |
| 4,960,577 A | 10/1990 | Torbov et al. | |
| 4,966,610 A | 10/1990 | Krigmont et al. | |
| 4,973,459 A | 11/1990 | Lippert et al. | |
| 4,975,257 A | 12/1990 | Lin | |
| 4,987,839 A | 1/1991 | Krigmont et al. | |
| 5,002,741 A | 3/1991 | Hooper | |
| 5,034,114 A | 7/1991 | Kukin | |
| 5,074,226 A | 12/1991 | Lynch | |
| 5,082,586 A | 1/1992 | Hooper | |
| 5,100,633 A | 3/1992 | Morrison | |
| 5,118,480 A | 6/1992 | Cook et al. | |
| 5,120,508 A | 6/1992 | Jones | |
| 5,165,902 A | 11/1992 | Bortz et al. | |
| 5,165,903 A | 11/1992 | Hunt et al. | |
| 5,219,536 A | 6/1993 | Pinnavaia et al. | |
| 5,246,680 A | 9/1993 | Esa | |
| 5,284,637 A | 2/1994 | Merritt et al. | |
| 5,346,674 A | 9/1994 | Weinwurm et al. | |
| 5,470,556 A | 11/1995 | Samish | |
| 5,582,807 A | 12/1996 | Liao et al. | |
| 5,585,081 A | 12/1996 | Chu et al. | |
| 5,591,249 A | 1/1997 | Hankins | |
| 5,591,412 A | 1/1997 | Jones et al. | |
| 5,591,417 A | 1/1997 | Buchanan et al. | |
| 5,599,508 A | 2/1997 | Martinelli | |
| 5,658,547 A | 8/1997 | Michalak et al. | |
| 5,678,493 A | 10/1997 | Kelley et al. | |
| 5,872,887 A | 2/1999 | Walker et al. | |
| 5,879,433 A | 3/1999 | Gallup et al. | |
| 5,938,818 A | 8/1999 | Miller | |
| 5,961,837 A | 10/1999 | Ferrara et al. | |
| 6,001,152 A | 12/1999 | Sinha | |
| 6,033,639 A | 3/2000 | Odenmo | |
| 6,117,405 A | 9/2000 | Frey et al. | |
| 6,126,910 A | 10/2000 | Wilhelm et al. | |
| 6,143,263 A * | 11/2000 | Johnson et al. | 423/242.1 |
| 6,180,074 B1 | 1/2001 | Fourcot et al. | |
| 6,267,802 B1 | 7/2001 | Baldrey et al. | |
| 6,270,555 B1 | 8/2001 | Wood et al. | |
| 6,290,872 B1 | 9/2001 | Fourcot et al. | |
| 6,303,083 B1 | 10/2001 | Johnson et al. | |
| 6,352,653 B1 | 3/2002 | Hirano et al. | |
| 6,490,984 B1 | 12/2002 | Moriya et al. | |
| 6,522,994 B1 | 2/2003 | Lang | |
| 6,722,295 B2 | 4/2004 | Zauderer | |
| 6,780,385 B2 * | 8/2004 | Sakurai et al. | 423/244.08 |
| 6,797,035 B2 | 9/2004 | Baldrey et al. | |
| 6,803,025 B2 * | 10/2004 | Meserole et al. | 423/243.08 |
| 2001/0047653 A1 | 12/2001 | Mizuno et al. | |
| 2002/0001556 A1 | 1/2002 | Sakurai et al. | |
| 2002/0054846 A1 | 5/2002 | Fagiolini et al. | |
| 2002/0061271 A1 | 5/2002 | Zauderer | |
| 2004/0040438 A1 | 3/2004 | Baldrey et al. | |
| 2005/0201914 A1 | 9/2005 | Ritzenthaler | |
| 2005/0260114 A1 | 11/2005 | Higgins et al. | |
| 2006/0034743 A1 | 2/2006 | Radway et al. | |
| 2007/0081936 A1 | 4/2007 | Maziuk | |

FOREIGN PATENT DOCUMENTS

| | | |
|---|---|---|
| EP | 0 309 848 A2 | 4/1989 |
| EP | 1004345 A2 | 5/2000 |
| JP | 63 175652 A | 7/1988 |
| WO | WO 93/14026 A | 7/1993 |
| WO | WO 02/08666 A1 | 1/2002 |
| WO | WO 2007/031552 A1 | 3/2007 |

OTHER PUBLICATIONS

Andrea B. Baldwin; "Trona Use in Dry Sodium Injection for Acid Gas Removal"; Solvay Minerals, Inc.; Houston, TX, date unknown.

Solvay; "Technologies for the Environment—Neutreck—Flue gas cleaning and recycling of residues"; BR 1610; Jul. 2002.

Solvay Minerals; "T-200 Natural Sodium Sesquicarbonate For Dry Sorbent Injection—Naturally, the one to use"; Houston, TX, date unknown.

Jack R. McDonald et al.; "Results from Sodium Conditioning Tests with Low SCA, Cold-Side Electrostatic Precipitators with Various Coals"; Indianapolis Power & Light Company; Indianapolis, Indiana, date unknown.

J.R. Peterson et al.; "$SO_3$ Removal From Flue Gas By Sorbent Injection EPRI HSTC Phase II Test Results"; US Environmental Protection Agency; vol. 23, Paper No. 6g (1995); Palo Alto, CA.

Richard T. Wilburn et al.; "SCR Ammonia Slip Distribution in Coal Plant Effluents and Dependence upon $SO_3$"; PowerPlant Chemistry 2004, 6(5).

R.K. Srivastava et al.; "Emissions of Sulfur Trioxide from Coal-Fired Power Plants"; Presented at Power-Gen International 2002, Dec. 10-12, 2002; Orlando, Florida.

James H. Turner et al.; "Electrostatic Precipitators"; Innovative Strategies and Economics Group, OAQPS; U.S. Environmental Protection Agency; Research Triangle Park; NC; Dec. 1995.

L.J. Muzio et al.; "Bench-Scale Study of the Dry Removal of $SO_2$ With Nahcolite and Trona"; Electric Power Research Institute; KVB, Inc.; EPRI CS-1744, Project 982-9, Final Report Mar. 1981; Irvine, CA.

Rangesh Srinivasan; "Study of Trona (Sodium Sesquicarbonate) Reactivity with Sulfor Dioxide in a Simulated Flue Gas"; University of Cincinnati; Mar. 2, 2004.

Glass Manufacturing; World Bank Group; Pollution Prevention and Abatement Handbook; Jul. 1998.

"Trona Use in Dry Sodium Injection for Acid Gas Removal"; Solvay Chemicals Technical Publication; Solvay Chemicals, Inc. 2005.

Douglas P. Ritzenthaler et al.; "Successful Mitigation of $SO_3$ Emissions While Simultaneously Enhancing ESP Operation at the General James M. Gavin Plant in Cheshire, Ohio by Employing Dry Sorbent Injection of Trona Upstream of the ESP"; Mega Symposium 2004; Aug. 31, 2004.

John Maziuk; "Successful Mitigation of $SO_3$, By Employing Dry Sorbent Injecetion of Trona Upstream of the ESP"; Mega Symposium 2005; Sep. 18, 2005.

Zevenhoven & Kilpinen; "Chapter 5 Particulates"; Particulates; 31pp; Dec. 6, 2001.

Ritzenthaler, Maziuk; "Successful $SO_3$ Mitigation While Enhancing ESP Operation at AEP's Gavin Plant by Dry Injection of Trona"; Solvay Chamicals, Inc.; 30 pp; Dec. 1, 2004.

Brussels Search Report, "Rapport De Recherche Documentaire"; 8 pp; 2005.

Office Action from U.S. Appl. No. 11/208,432; Inventor Maziuk Jr.; Mail Date Jun. 11, 2007.

Office Action from U.S. Appl. No. 11/229,056; Inventor Maziuk Jr.; Mail Date Jul. 20, 2006.

Joseph R. Peterson, et al.; "Pilot-Scale Evaluation of Sorbent Injection to Remove $SO_3$ and HC1"; 1990 SO2 Control Symposium vol. 3: Sessions 6B,6C,7A,7B and Poster; Sponsored by Electric Power Research Institute and U.S. Environmental Protection Agency; May 8-11, 1990.

"Clean Coal Technology", Topical Report No. 13; U.S. Dept. of Energy, ABB Environmental Systems, The Babcock & Wilcox Company, and Public Service Company of Colorado; May 1999.

"Combined Power Plant Air Pollutant Control Mega Symposium", Washington, DC; Aug. 30-Sep. 2, 2004.

"Broyage de Bicarbonate de Sodium"; Dec. 2003.

J.P. Gooch, et al.; "Improvement of Hot-side Precipitator Performance with Sodium Conditioning—An Interim Report"; Control Technology News; Mar. 1981.

Sturtevant, Inc.; "Pin Mills" brochure; 2004.

Tim C. Keener Ph.D.; "Sponsored Research Agreement" between Solvay Minerals, Inc. and the University of Cincinnati; Exhibit A: "Study of Trona (Sodium Sesquicarbonate) Reactivity with Sulfur Dioxide in a Simulated Flue Gas"; Feb. 23, 2001.

Flint Goodrich, et al.; Injection of Sodium Sequicarbonate (Trona T-200) for $SO_2$ Emission Control at Golden Valley Electric Association, Healy Power Plant Unit No. 1; Aug. 6-8, 2003.

AEP: Environmental: Environmental news releases: Corporate Citizenship—"AEP to Begin Construction of Emission Control System at AMOS, Mountaineer Plant as Part of Environmental Compliance Program"; http://www.aep.com/environmental/news; 3 pg; Feb. 13, 2008.

"Mesh to Micron Conversion Chart", Fluid Engineering; http://www.fluideng.com/FE/meshmicro.html; 1 pg; Feb. 27, 2008.

Cardinal Search Report "Method of Removing SO3 from a Flue Gas Stream 12493.17", 5 pg: Mar. 7, 2008.

Cardinal Search Report Extended View "Method of Removing SO3 from a Flue Gas Stream 12493.17", 17 pg; Mar. 7, 2008.

"International Search Report" in related International Application No. PCT/2006/066358, dated Nov. 29, 2006.

"International Search Report" in related International Application No. PCT/2006/066359, dated Dec. 13, 2006.

Office Action, mailed Nov. 29, 2007, in commonly-owned U.S. Appl. No. 11/208,432.

Office Action, mailed Nov. 1, 2007, in U.S. Appl. No. 11/073,887.

DOE/NETL-2002/1160 "Integrated Dry $NO_x/SO_2$ Emissions Control System A DOE Assessment"; U.S. Department of Energy, National Energy Technology Laboratory; Oct. 2001; 47 pgs.

"SO2 Control System Dry Injection of Trona T-200 Description and Operation"; Golden Valley Electric Association, Inc., Healy Power Plant, Unit No. 1; Goodrich Management & Construction Services, LLC; circa May 2005.

* cited by examiner

METHOD OF REMOVING SULFUR TRIOXIDE FROM A FLUE GAS STREAM

BACKGROUND

The present invention relates to the purification of gases, and more particularly to a method of purifying flue gases which contain noxious gases such as $SO_3$.

$SO_3$ is a noxious gas that is produced from the combustion of sulfur-containing fuel. When present in flue gas, the $SO_3$ can form an acid mist that condenses in electrostatic precipitators, ducts or bag houses, causing corrosion. $SO_3$ at concentrations as low as 5-10 ppm in exhaust gas can also result in white, blue, purple, or black plumes from the cooling of the hot stack gas in the cooler air in the atmosphere.

The effort to reduce $NO_x$ emissions from coal-fired power plants via selective catalytic reactors (SCRs) has resulted in the unintended consequence of oxidizing $SO_2$ to $SO_3$ and thereby increasing total $SO_3$ emissions. SCRs employ a catalyst (typically vanadium pentoxide) to convert $NO_x$ to $N_2$ and $H_2O$ with the addition of $NH_3$, but there is also an unintended oxidation of the $SO_2$ to $SO_3$. Although the higher stack $SO_3$ concentrations are still relatively low, the emissions can sometimes produce a highly visible secondary plume, which, although unregulated, is nonetheless perceived by many to be problematic. Efforts to reduce the $SO_3$ levels to a point where no secondary $SO_3$ plume is visible can impede particulate collection for stations that employ electrostatic precipitators (ESPs). $SO_3$ in the flue gas absorbs onto the fly ash particles and lowers fly ash resistivity, thereby enabling the ESP to capture the particle by electrostatic means. Some plants actually inject $SO_3$ to lower fly ash resistivity when ash resistivity is too high.

$SO_3$ reacts with water vapor in the flue gas ducts of the coal power plant and forms vaporous $H_2SO_4$. A portion of this condenses out in the air heater baskets. Another portion of the sulfuric acid vapor can condense in the duct if the duct temperature is too low, thereby corroding the duct. The remaining acid vapor condenses either when the plume is quenched when it contacts the relatively cold atmosphere or when wet scrubbers are employed for flue gas desulfurization (FGD), in the scrubber's quench zone. The rapid quenching of the acid vapor in the FGD tower results in a fine acid mist. The droplets are often too fine to be absorbed in the FGD tower or to be captured in the mist eliminator. Thus, there is only limited $SO_3$ removal by the FGD towers. If the sulfuric acid levels emitted from the stack are high enough, a secondary plume appears.

Dry sorbent injection (DSI) has been used with a variety of sorbents to remove $SO_3$ and other gases from flue gas. However, DSI has typically been done in the past at temperatures lower than around 370° F. because equipment material, such as baghouse media, cannot withstand higher temperatures. Additionally, many sorbent materials sinter or melt at temperatures greater than around 400° F., which makes them less effective at removing gases. The reaction products of many sorbent materials also adhere to equipment and ducts, which requires frequent cleaning of the process equipment.

SUMMARY

In one aspect, a method of removing $SO_3$ from a flue gas stream including $SO_3$ is provided. The method includes providing a reaction compound selected from the group consisting of sodium carbonate, sodium bicarbonate, sodium sesquicarbonate, and mixtures thereof. The reaction compound is injected into the flue gas stream. The temperature of the flue gas is between about 500° F. and about 850° F. The reaction compound is maintained in contact with the flue gas for a time sufficient to react a portion of the reaction compound with a portion of the $SO_3$ to reduce the concentration of the $SO_3$ in the flue gas stream.

In another aspect, a method of removing $SO_3$ from a flue gas stream including at least about 3 ppm $SO_3$ includes providing a source of trona having a mean particle size between about 10 micron and about 40 micron. The trona is injected as a dry granular material into the flue gas stream. The temperature of the flue gas is between about 275° F. and about 365° F. The trona is maintained in contact with the flue gas for a time sufficient to react a portion of the sodium sorbent with a portion of the $SO_3$ to reduce the concentration of the $SO_3$ in the flue gas stream. The reaction product comprises $Na_2SO_4$.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
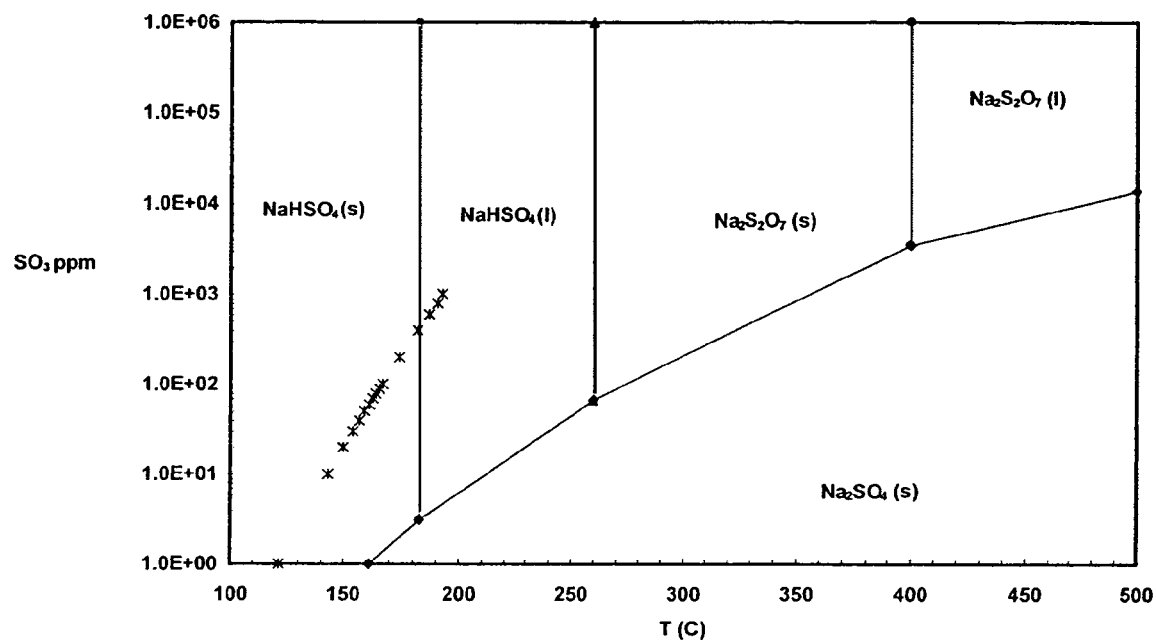
FIG. 1 is a phase diagram showing the reaction products of trona with $SO_3$ as a function of flue gas temperature and $SO_3$ concentration.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

Dry sorbent injection (DSI) has been used as a low cost alternative to a spray dry or wet scrubbing system for the removal of $SO_3$. In the DSI process, the sorbent is stored and injected dry into the flue duct where it reacts with the acid gas. Under certain processing conditions, the reaction product of the sorbent and the acid gas is a sticky ash. The sticky ash tends to stick to the process equipment and ducts, thus requiring frequent cleaning. Thus, it would be beneficial to have a process that minimizes the amount of sticky ash reaction product.

The present invention provides a method of removing $SO_3$ from a flue gas stream comprising $SO_3$ by injecting a reaction compound such as sodium sesquicarbonate, sodium bicarbonate, or soda ash into a flue gas stream to react with $SO_3$. Sodium sesquicarbonate is preferably provided from trona. Trona is a mineral that contains about 85-95% sodium sesquicarbonate ($Na_2CO_3 \cdot NaHCO_3 \cdot 2H_2O$). A vast deposit of mineral trona is found in southwestern Wyoming near Green River. As used herein, the term "trona" includes other sources of sodium sesquicarbonate. The term "flue gas" includes the exhaust gas from any sort of combustion process (including coal, oil, natural gas, etc.). Flue gas typically includes acid gases such as $SO_2$, HCl, $SO_3$, and $NO_x$.

When heated at or above 275° F., sodium sesquicarbonate undergoes rapid calcination of contained sodium bicarbonate to sodium carbonate, as shown in the following reaction:

$$2[Na_2CO_3 \cdot NaHCO_3 \cdot 2H_2O] \rightarrow 3Na_2CO_3 + 5H_2O + CO_2$$

Sodium bicarbonate undergoes a similar reaction at elevated temperatures:

$$2NaHCO_3 \rightarrow 3Na_2CO_3 + H_2O + CO_2$$

A preferred chemical reaction of the reaction compound with the $SO_3$ is represented below:

$$Na_2CO_3 + SO_3 \rightarrow Na_2SO_4 + CO_2$$

However, under certain conditions, undesirable reactions may occur which produce sodium bisulfate. If the sodium sesquicarbonate or sodium bicarbonate is not completely calcined before reaction with $SO_3$, the following reaction occurs:

$$NaHCO_3 + SO_3 \rightarrow NaHSO_4 + SO_3$$

Under certain conditions, another undesirable reaction produces sodium bisulfate as represented below:

$$Na_2CO_3 + 2SO_3 + H_2O \rightarrow 2NaHSO_4 + CO_2$$

Sodium bisulfate is an acid salt with a low melt temperature and is unstable at high temperatures, decomposing as indicated in the following reaction:

$$2NaHSO_4 \rightarrow Na_2S_2O_7$$

The type of reaction product of the $Na_2CO_3$ and the $SO_3$ depends on the $SO_3$ concentration and the temperature of the flue gas. FIG. 1 is a phase diagram showing the typical reaction products of trona with $SO_3$ as a function of flue gas temperature and $SO_3$ concentration. In particular, above a certain $SO_3$ concentration, the reaction product can be solid $NaHSO_4$, liquid $NaHSO_4$, $Na_2SO_4$, or $Na_2S_2O_7$, depending on the flue gas temperature. The boundary between the liquid $NaHSO_4$ and the solid $Na_2SO_4$ at a temperature above 370° F. may be represented by the equation $\log[SO_3]=0.009135T-2.456$, where $[SO_3]$ is the log base 10 of the $SO_3$ concentration in ppm and T is the flue gas temperature in ° F. Liquid $NaHSO_4$ is particularly undesirable because it is "sticky" and tends to adhere to the process equipment, and cause other particulates, such as fly ash, to also stick to the equipment. Thus, it is desirable to operate the process under conditions where the amount of liquid $NaHSO_4$ reaction product is minimized. Thus, the process may be operated at a temperature below about 370° F., above about 525° F., or at a temperature and $SO_3$ concentration where $\log[SO_3]<0.009135T-2.456$.

The temperature of the flue gas varies with the location in the injection system and may also vary somewhat with time during operation. As the temperature of the flue gas increases, the reaction product of the sodium compound and the $SO_3$ ranges from solid $NaHSO_4$, to liquid $NaHSO_4$, to solid $Na_2SO_4$ or $Na_2S_2O_7$. Therefore, to avoid the formation of sticky ash, the process is preferably operated in a suitable temperature range. In one embodiment, the temperature of the flue gas where the trona is injected is between about 500° F. and about 850° F. The trona is maintained in contact with the flue gas for a time sufficient to react a portion of the trona with a portion of the $SO_3$ to reduce the concentration of the $SO_3$ in the flue gas stream. The temperature of the flue gas is preferably greater than about 500° F. The temperature of the flue gas is preferably less than about 800° F., and most preferably less than about 750° F. The temperature of the flue gas is most preferably between about 525° F. and about 750° F. In another embodiment, the temperature of the flue gas is between about 275° F. and about 365° F. This temperature range is below the temperature for formation of the sticky $NaHSO_4$.

The $SO_3$ concentration of the flue gas stream to be treated is generally at least about 3 ppm, and commonly between about 10 ppm and about 200 ppm. In order to avoid the adhesion of waste material on the process equipment, when operated at flue gas temperatures greater than about 500° F. the non-gaseous reaction product is preferably less than about 5% $NaHSO_4$, and most preferably less than about 1% $NaHSO_4$. The desired outlet $SO_3$ concentration of the gas stack is preferably less than about 50 ppm, more preferably less than about 20 ppm, even more preferably less than about 10 ppm, and most preferably less than about 5 ppm. The byproduct of the reaction is collected with fly ash.

Trona, like most alkali reagents, will tend to react more rapidly with the stronger acids in the gas stream first, and then after some residence time it will react with the weaker acids. Such gas constituents as HCl and $SO_3$ are strong acids and trona will react much more rapidly with these acids than it will with a weak acid such as $SO_2$. Thus, the injected reaction compound can be used to selectively remove $SO_3$ without substantially decreasing the amount of $SO_2$ in the flue gas stream.

Figure 2:
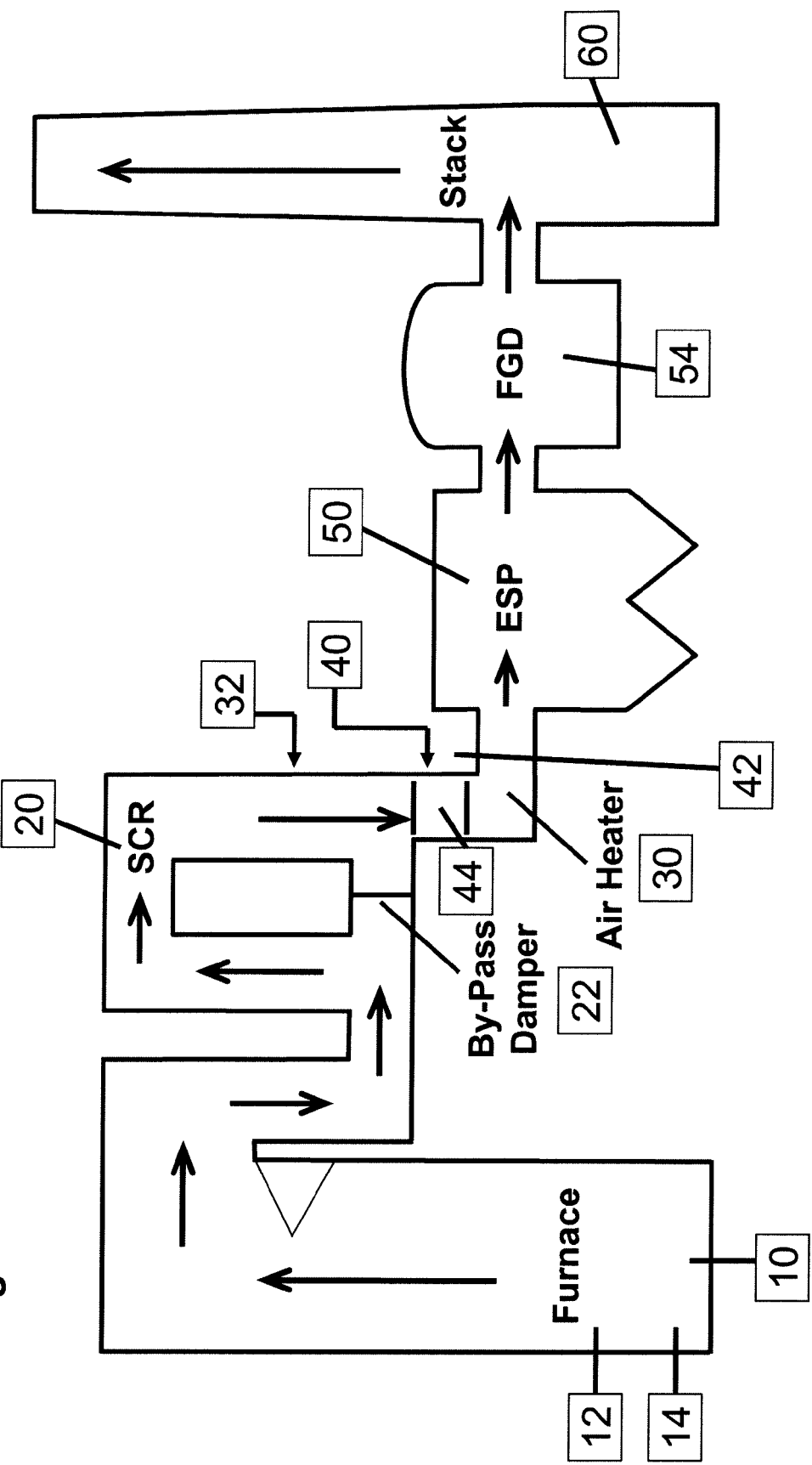
FIG. 2 is a schematic of one embodiment of a flue gas desulfurization system.

A schematic of one embodiment of the process is shown in FIG. 2. The furnace or combustor 10 is fed with a fuel source 12, such as coal, and with air 14 to burn the fuel source 12. From the combustor 10, the combustion gases are conducted to a heat exchanger or air heater 30. Ambient air 32 may be injected to lower the flue gas temperature. A selective catalytic reduction (SCR) device 20 may be used to remove $NO_x$ gases. A bypass damper 22 can be opened to bypass the flue gas from the SCR. The outlet of the heat exchanger or air heater 30 is connected to a particulate collection device 50. The particulate collection device 50 removes particles made during the combustion process, such as fly ash, from the flue gas before it is conducted to an optional wet scrubber vessel 54 and then to the gas stack 60 for venting. The particulate collection device 50 may be an electrostatic precipitator (ESP). Other types of particulate collection devices, such as a baghouse, may also be used for solids removal. The baghouse contains filters for separating particles made during the combustion process from the flue gas.

The $SO_3$ removal system includes a source of reaction compound 40. The reaction compound is selected from sodium sesquicarbonate, sodium bicarbonate, and soda ash. The reaction compound is preferably provided as particles with a mean particle size between about 10 micron and about 40 micron, most preferably between about 24 micron and about 28 micron. The reaction compound is preferably in a dry granular form.

The reaction compound is preferably sodium sesquicarbonate in the form of trona. A suitable trona source is T-200® trona, which is a mechanically refined trona ore product available from Solvay Chemicals. T-200® trona contains about 97.5% sodium sesquicarbonate and has a mean particle size of about 24-28 micron. The $SO_3$ removal system may also include a ball mill pulverizer, or other type of mill, for decreasing and/or otherwise controlling the particle size of the trona or other reaction compound.

The reaction compound is conveyed from the reaction compound source 40 to the injector 42. The reaction compound may be conveyed pneumatically or by any other suitable method. Apparatus for injecting the reaction compound is schematically illustrated in FIG. 2. The injection apparatus 42 introduces the reaction compound into flue gas duct section 44, which is preferably disposed at a position upstream of the air heater 30. The injection system is preferably designed to maximize contact of the reaction compound with the $SO_3$ in the flue gas stream. Any type of injection apparatus known in the art may be used to introduce the reaction compound into the gas duct. For example, injection can be accomplished directly by a compressed air-driven eductor. Ambient air 32 may be injected to lower the flue gas temperature before the injection point 42.

The process requires no slurry equipment or reactor vessel if the reaction compound is stored and injected dry into the flue duct 44 where it reacts with the acid gas. However, the process may also be used with humidification of the flue gas or wet injection of the reaction compound. Additionally, the particulates can be collected wet through an existing wet scrubber vessel 54 should the process be used for trim scrubbing of acid mist. In particular, the flue gas desulfurization system may be operated so that the $SO_3$ removal is accomplished by injecting the reaction compound with the $SO_3$, while the majority of the $SO_2$ is removed by the wet scrubber 54.

The process may also be varied to control the flue gas temperature. For example, the flue gas temperature upstream of the trona may be adjusted to obtain the desired flue gas temperature where the reaction compound is injected. Additionally, ambient air 32 may be introduced into the flue gas stream to lower the flue gas temperature and the flue gas temperature monitored where the reaction compound is injected. Other possible methods of controlling the flue gas temperature include using heat exchanges and/or air coolers. The process may also vary the trona injection location or include multiple locations for reaction compound injection.

For the achievement of desulfurization, the reaction compound is preferably injected at a rate with respect to the flow rate of the $SO_3$ to provide a normalized stoichiometric ratio (NSR) of sodium to sulfur of about 1.0 or greater. The NSR is a measure of the amount of reagent injected relative to the amount theoretically required. The NSR expresses the stoichiometric amount of sorbent required to react with all of the acid gas. For example, an NSR of 1.0 would mean that enough material was injected to theoretically yield 100 percent removal of the $SO_3$ in the inlet flue gas; an NSR of 0.5 would theoretically yield 50 percent $SO_3$ removal. The reaction of $SO_3$ with the sodium carbonate is very fast and efficient, so that a NSR of only one is generally required for $SO_3$ removal. The reaction compound preferentially reacts with $SO_3$ over $SO_2$, so $SO_3$ will be removed even if large amounts of $SO_2$ are present. Preferably, an NSR of less than 2.0 or more preferably less than 1.5 is used such that there is no substantial reduction of the $SO_2$ concentration in the flue gas caused by reaction with excess sorbent.

In one embodiment, the flue gas stream further comprises $SO_2$, and sufficient reaction compound is added to also remove some of the $SO_2$. The reaction compound is maintained in contact with the flue gas for a time sufficient to react a portion of the reaction compound with a portion of the $SO_2$ to reduce the concentration of the $SO_2$ in the flue gas stream. This may be particularly useful in small plants, where it is more economical to have a single system for removing both $SO_2$ and $SO_3$ rather than adding a wet scrubber to remove the $SO_2$.

Because $NO_x$ removal systems tend to oxidize existing $SO_2$ into $SO_3$, the injection system may also be combined with an $NO_x$ removal system. The trona injection system may also be combined with other $SO_x$ removal systems, such as sodium bicarbonate, lime, limestone, etc. in order to enhance performance or remove additional hazardous gases such as HCl, $NO_x$, and the like.

EXAMPLES

Studies were conducted in an electric generation plant in Ohio using a hot side electrostatic precipitator (ESP) and no baghouse. The plant used a catalyst for $NO_x$ removal, which caused elevated $SO_3$ levels in the flue gas. The $SO_3$ concentration in the flue gas was between about 100 ppm and about 125 ppm. The trona used was T-200® from Solvay Chemicals.

Example 1

T-200® trona was injected into the flue gas at a flue gas temperature of 367° F. A perforated plate of an ESP in the plant had significant solids buildup after operation of the $SO_3$ removal system for about two weeks.

Example 2

The operation of Example 1 was repeated with the change that the trona was injected at a flue gas temperature below 365° F. In comparison to the perforated plate of Example 1, a perforated plate of an ESP in the plant had significantly less solids buildup after operation of the $SO_3$ removal system for two weeks than.

Example 3

The operation of Example 1 is repeated with the change that the trona is injected into flue gas at a temperature of about 500° F. A perforated plate of an ESP in the plant is relatively free of solids buildup after operation of the $SO_3$ removal system for two weeks using T-200® trona.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed is:

1. A method for reducing fouling during the removal of $SO_3$ from a flue gas stream comprising $SO_3$ and fly ash, the method comprising:

providing a reagent, comprising sodium sesquicarbonate, wherein the mean particle size of the reagent is less than about 40 microns;

injecting the reagent into the flue gas stream in a flue gas duct, wherein the temperature of the flue gas is between about 500° F. and about 850° F.;

maintaining the reagent in contact with the flue gas for a time sufficient and at a sufficient temperature to react a portion of the reagent with a portion of the $SO_3$ to reduce the concentration of the $SO_3$ in the flue gas stream and to substantially avoid formation of a liquid phase $NaHSO_4$ reaction product that combines with the fly ash so as to not form a sticky ash residue that adheres to the flue gas duct, wherein the reaction product of the reagent and the $SO_3$ is selected from the group consisting of $Na_2SO_4$, $Na_2S_2O_7$, and mixtures thereof.

2. The method of claim 1 further comprising providing an $NO_x$ removal system upstream of the location where the reagent is injected.

3. The method of claim 1 wherein the flue gas stream comprises at least about 3 ppm $SO_3$ upstream of the location where the reagent is injected.

4. The method of claim 3 wherein the flue gas stream comprises between about 10 ppm and about 200 ppm $SO_3$ upstream of the location where the reagent is injected.

5. The method of claim 1 wherein the mean particle size of the reagent is between about 10 micron and about 40 micron.

6. The method of claim 5 wherein the mean particle size of the reagent is between about 24 micron and about 28 micron.

7. The method of claim 1 wherein the temperature of the flue gas is greater than about 550° F.

8. The method of claim 1 wherein the temperature of the flue gas is less than about 750° F.

9. The method of claim 1 wherein the temperature of the flue gas is between about 500° F. and about 750° F.

10. The method of claim 1 wherein the reagent is injected at a rate with respect to the flow rate of the $SO_3$ to provide a normalized stoichiometric ratio of sodium to sulfur in the form of $SO_3$ of between about 1.0 and 1.5.

11. The method of claim 1 wherein the reagent is injected as a dry material.

12. The method of claim 1 further comprising milling the reagent to a desired mean particle size at a location proximate the flue gas stream.

13. A method for reducing fouling during the removal of $SO_3$ from a flue gas stream comprising $SO_3$ and fly ash, the method comprising:
    providing a source of trona, wherein the trona is provided in the form of particles with a mean particle size of between about 10 micron and about 40 micron;
    injecting the trona as a dry granular material into the flue gas stream in a flue gas duct, wherein the temperature of the flue gas is between about 500°F. and about 850° F. and wherein the flue gas stream comprises at least about 3ppm $SO_3$; and
    maintaining the trona in contact with the flue gas for a time sufficient and at a sufficient temperature to react a portion of the trona with a portion of the $SO_3$ to reduce the concentration of the $SO_3$ in the flue gas stream, and to substantially avoid formation of a liquid phase $NaHSO_4$ reaction product that combines with the fly ash so as to not form a sticky ash residue that adheres to the flue gas duct.

14. The method of claim 13 wherein the flue gas stream comprises between about 10 ppm and about 200 ppm $SO_3$ upstream of the location where the trona is injected.

15. The method of claim 13 wherein the temperature of the flue gas is between about 500° F. and about 750° F.

16. The method of claim 13 wherein the reaction product of the reagent and the $SO_3$ is selected from the group consisting of $Na_2SO_4$, $Na_2S_2O_7$, and mixtures thereof.

17. The method of claim 13 further comprising adjusting the flue gas temperature upstream of the trona to obtain the desired flue gas temperature where the trona is injected.

18. The method of claim 17 wherein the adjusting further comprises introducing ambient air into the flue gas stream and monitoring the flue gas temperature where the trona is injected.

19. The method of claim 17 wherein the adjusting further comprises controlling the flow of a material through a heat exchanger in communication with the flue gas.

20. A method of reducing fouling during the removal of $SO_3$ from a flue gas stream comprising $SO_3$ and fly ash, the method comprising:
    providing a reagent, comprising sodium sesquicarbonate;
    injecting the reagent into the flue gas stream in a flue gas duct, wherein the temperature of the flue gas is at or above about 500° F. and the reagent is maintained in contact with the flue gas at a sufficient temperature to avoid formation of a liquid phase $NaHSO_4$ reaction product that combines with the fly ash so as to not form a sticky ash residue that adheres to the flue gas duct;
    maintaining the reagent in contact with the flue gas for a time sufficient to react a portion of the reagent with a portion of the $SO_3$ to reduce the concentration of the $SO_3$ in the flue gas stream; and
    providing a $NO_x$ removal system upstream of the location where the reagent is injected.

21. The method of claim 20 wherein the reagent is injected at a rate with respect to the flow rate of the $SO_3$ to provide a normalized stoichiometric ratio of sodium to sulfur in the form of $SO_3$ of between about 1.0 and 1.5.

* * * * *

Adverse Decisions in Interference

Patent No. 7,481,987, John Maziuk, Jr., METHOD OF REMOVING SULFUR TRIOXIDE FROM A FLUE GAS STREAM, Interference No. 105,693, final judgment adverse to the patentees rendered March 15, 2010, as to claims 1-20.

*(Official Gazette, July 27, 2010)*